(12) United States Patent
Reichhardt

(10) Patent No.: US 8,201,474 B2
(45) Date of Patent: Jun. 19, 2012

(54) PIVOTAL MOTOR ARRANGEMENT FOR THE STEERING WHEEL OF A VEHICLE

(76) Inventor: Andreas Reichhardt, Hungen (DE)

( * ) Notice: Subject to any disclaimer, the term of this patent is extended or adjusted under 35 U.S.C. 154(b) by 550 days.

(21) Appl. No.: 12/387,936

(22) Filed: May 8, 2009

(65) Prior Publication Data
US 2009/0288515 A1  Nov. 26, 2009

(30) Foreign Application Priority Data

May 21, 2008  (DE) .......................... 10 2008 024 591

(51) Int. Cl.
  *B62D 5/04*  (2006.01)
  *B62D 1/22*  (2006.01)
(52) U.S. Cl. .............................. 74/494; 180/443; 476/64
(58) Field of Classification Search .................... 74/494; 180/443; 476/64, 65; 16/297, 350
See application file for complete search history.

(56) References Cited

U.S. PATENT DOCUMENTS

| | | | |
|---|---|---|---|
| 2,206,326 A | * | 7/1940 | Ludwig et al. .................. 16/350 |
| 2,805,585 A | | 9/1957 | Besserman |
| 6,135,485 A | * | 10/2000 | Filbrun .......................... 280/493 |
| 7,360,623 B2 | | 4/2008 | Green et al. |

FOREIGN PATENT DOCUMENTS

DE  28 16 177  10/1979

\* cited by examiner

*Primary Examiner* — William C Joyce
(74) *Attorney, Agent, or Firm* — Collard & Roe, P.C.

(57) ABSTRACT

A motor arrangement on the steering wheel of a vehicle has a motor, a friction wheel drivable by the motor and engagable against the steering wheel, and a motor mount having a main support that is securely connectable to the vehicle and a motor support that is mounted on the main support for pivotal movement about an axle and is securely connectable to the motor, and a spring bearing against the main support and the motor support and attempting to turn the motor support relative to the main support in a direction of engagement. The motor arrangement includes a locking device which limits the pivoting movement of the motor support relative to the main support, adopts a locked position upon reaching a first pivot angle as the result of a pivoting movement of the motor support in the direction of disengagement, and is unlockable by a pivoting movement in the direction of disengagement which exceeds the first pivot angle by a second pivot angle.

11 Claims, 8 Drawing Sheets

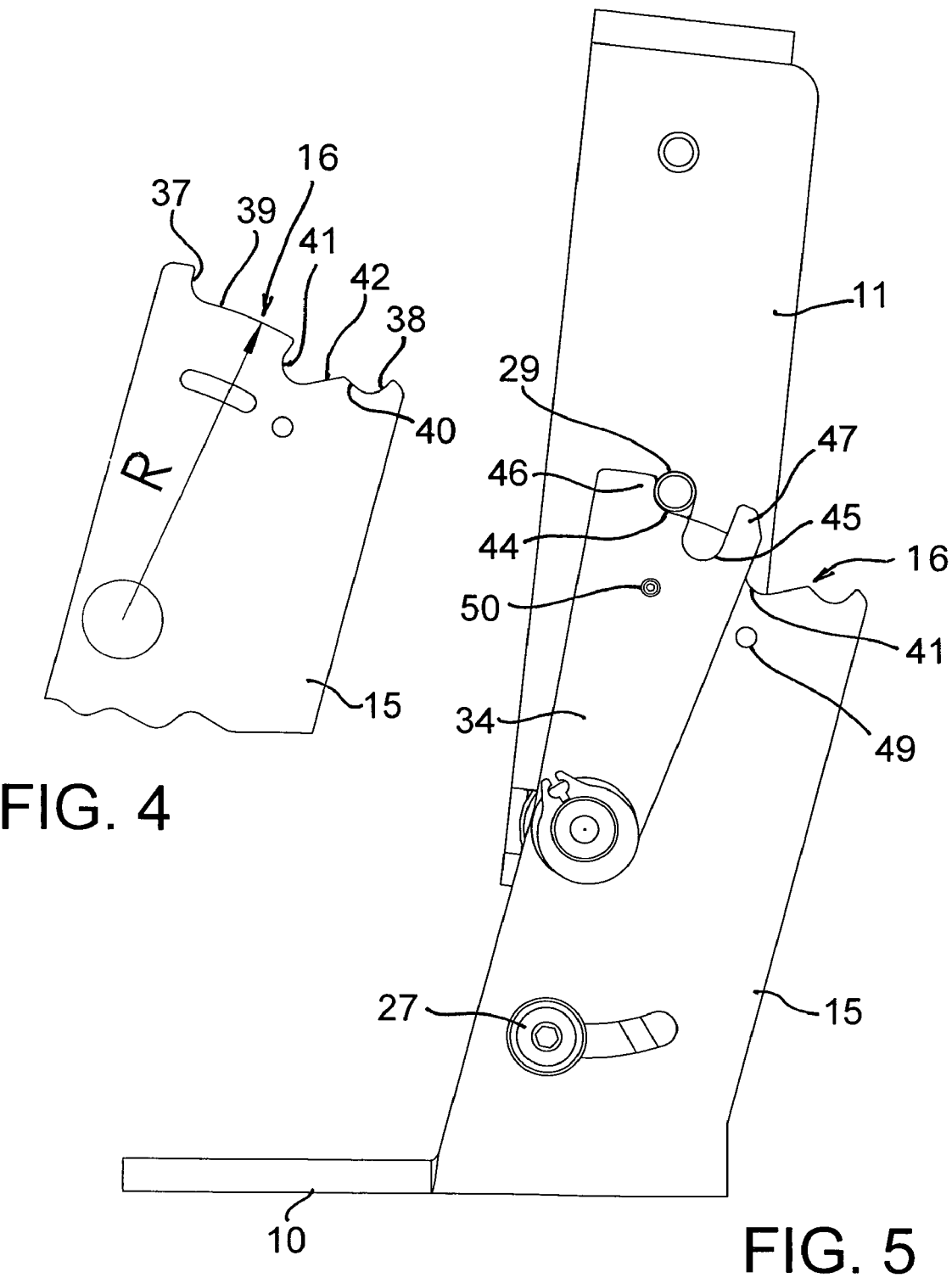

PIVOTAL MOTOR ARRANGEMENT FOR THE STEERING WHEEL OF A VEHICLE

CROSS REFERENCE TO RELATED APPLICATIONS

The Applicant claims priority under 35 U.S.C. §119 of German Patent Application No. 10 2008 024 591.7 filed May 21, 2008.

FIELD OF THE INVENTION

This invention relates to a pivotal motor arrangement on the steering wheel of a vehicle, comprising a motor, a friction wheel drivable by the motor and engagable against the steering wheel, and a motor mount having a main support that is securely connectable to the vehicle and a motor support that is mounted on the main support for pivotal movement about an axle and is securely connectable to the motor, and a spring bearing against the main support and the motor support and attempting to turn the motor support relative to the main support in a direction of engagement.

BACKGROUND OF THE INVENTION

A motor arrangement of the type referred to is known from U.S. Pat. No. 2,805,585. In the known motor arrangement, the main support is secured to the steering column by a bracket, and the motor support which is arranged essentially parallel to the steering column is continuously acted upon by the force of a tension spring in the direction of the steering wheel. As a result, the electric motor fastened to the motor support is pressed permanently by its friction roller against the steering wheel. Although the motor can be swung manually away from the steering wheel under increased tensioning of the spring, there are no means available for holding the motor in the swung-away position.

In another pivotal motor arrangement of the type described known from DE 28 16 177 C2, the motor mount has a main support securely connected to the vehicle and a motor support securely connected to the motor. The motor support is mounted on the main support for pivotal movement about an axis parallel to the steering column, such that the motor can be disengaged by pivoting into a position that is remote from the steering wheel.

SUMMARY OF THE INVENTION

It is an object of the present invention to provide a motor arrangement of the type initially referred to, which is lockable in a position disengaged from the steering wheel. It is another object of the invention to provide a motor arrangement which is movable in simple manner from the disengaged position into the engaged position and from here back again to the disengaged position.

According to the invention the motor arrangement includes a locking device which limits the pivoting movement of the motor support relative to the main support, adopts a locked position upon reaching a first pivot angle as the result of a pivoting movement of the motor support in the direction of disengagement, and is unlockable by a pivoting movement in the direction of disengagement which exceeds the first pivot angle by a second pivot angle.

The motor arrangement of the invention has the advantage of obviating the need to provide additional control elements in order to adopt the locked position, release the lock and reengage the motor arrangement with the steering wheel. Rather it suffices for the motor to be swung away by hand more or less far from the steering wheel in order to activate or release the locking device. Manipulation of the motor arrangement of the invention is therefore very easy.

Another proposal of the invention provides that the locking device includes a locking element which is movably mounted on the motor support in a guide, can be urged by the force of a spring against a control cam formed on the main support, and slides along the control cam when the motor support executes a pivoting movement. The control cam includes preferably a leading guiding surface, a trailing guiding surface and, between the two guiding surfaces, a detent notch which is connected by a ramp surface to the trailing guiding surface. To limit the pivot angle of the motor support it would also be possible to provide, at the forward end of the leading guiding surface and at the rearward end of the trailing guiding surface, stop surfaces which limit the movement of the locking element.

According to another proposal of the invention, the locking device includes a control element on which the locking element is able to take support such that it is prevented from snapping into the detent notch when the motor support performs a pivoting movement out of the released position in the direction of the steering wheel. The control element is arranged preferably on the main support adjacent to the control cam and is movable in the longitudinal direction of the control cam, with the control element having a control recess for locking engagement by the locking element.

BRIEF DESCRIPTION OF THE DRAWINGS

The present invention will be explained in more detail in the following with reference to an embodiment illustrated in the accompanying drawings. In the drawings.

FIG. 4 is a view of a section of an arm of the motor mount of FIG. 3;

FIG. 5 is a side view of the motor mount of FIG. 3;

DETAILED DESCRIPTION OF THE EMBODIMENT

Figure 1:
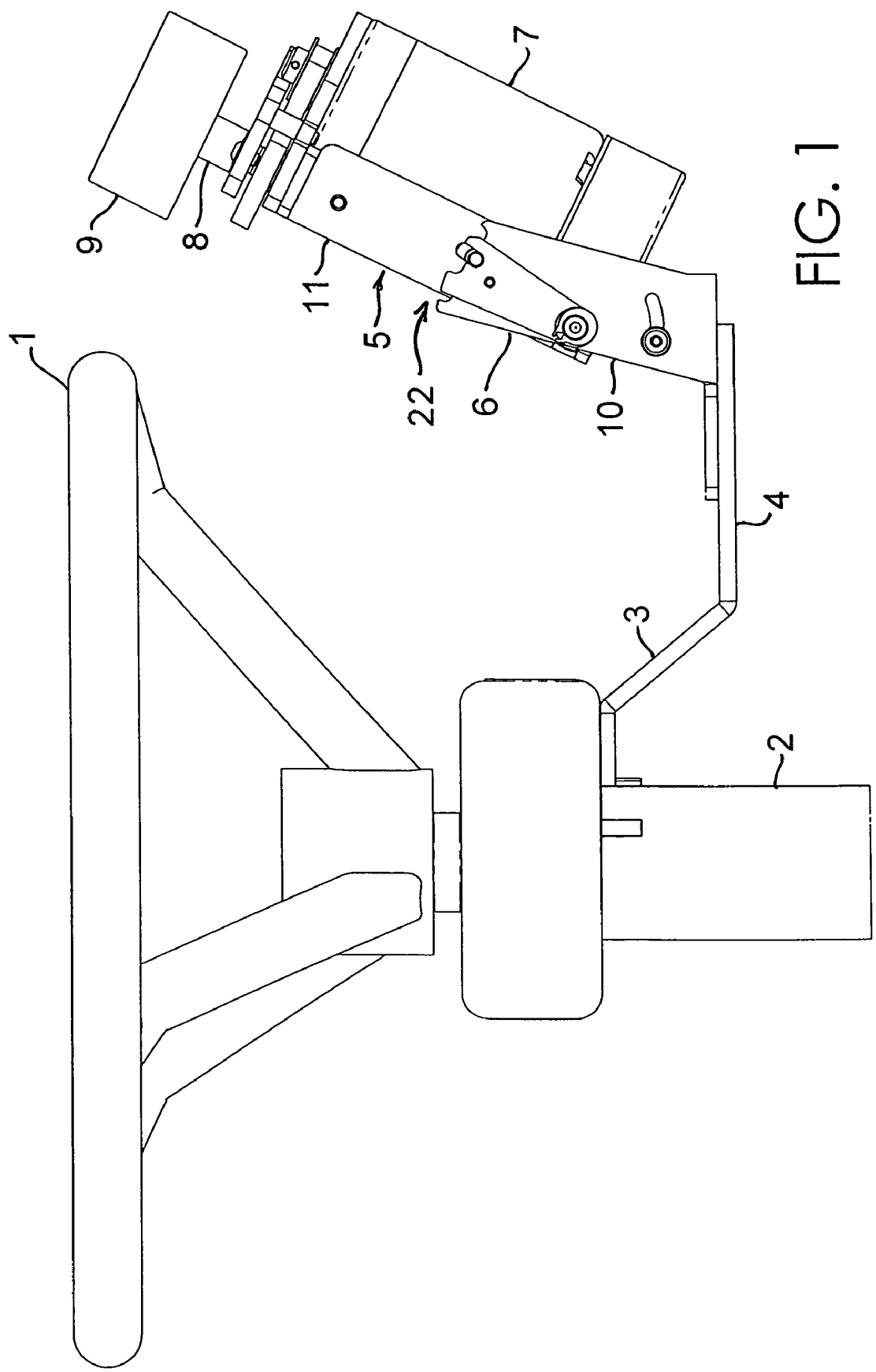
FIG. 1 is a view of a motor arrangement of the invention in a position as disengaged from a steering wheel.

FIG. 1 shows a steering wheel 1 and an end section of an associated steering column 2 of an agricultural vehicle, for example a tractor. Fastened to the steering column 2 is an arm 3 which extends from the steering column 2 substantially in radial direction and has a free end 4 which is aligned substantially parallel to the plane of the steering wheel 1 and mounts a pivotal motor arrangement 5 for example by means of screws. The motor arrangement 5 includes a motor mount 6 and, fastened thereto, an electric motor 7, for example a reversible direct current motor with stepping function. The electric motor 7 has a drive shaft 8 which carries a friction wheel 9. A releasable locking device 22 holds the electric motor 7 in the disengaged position shown.

Figure 2:
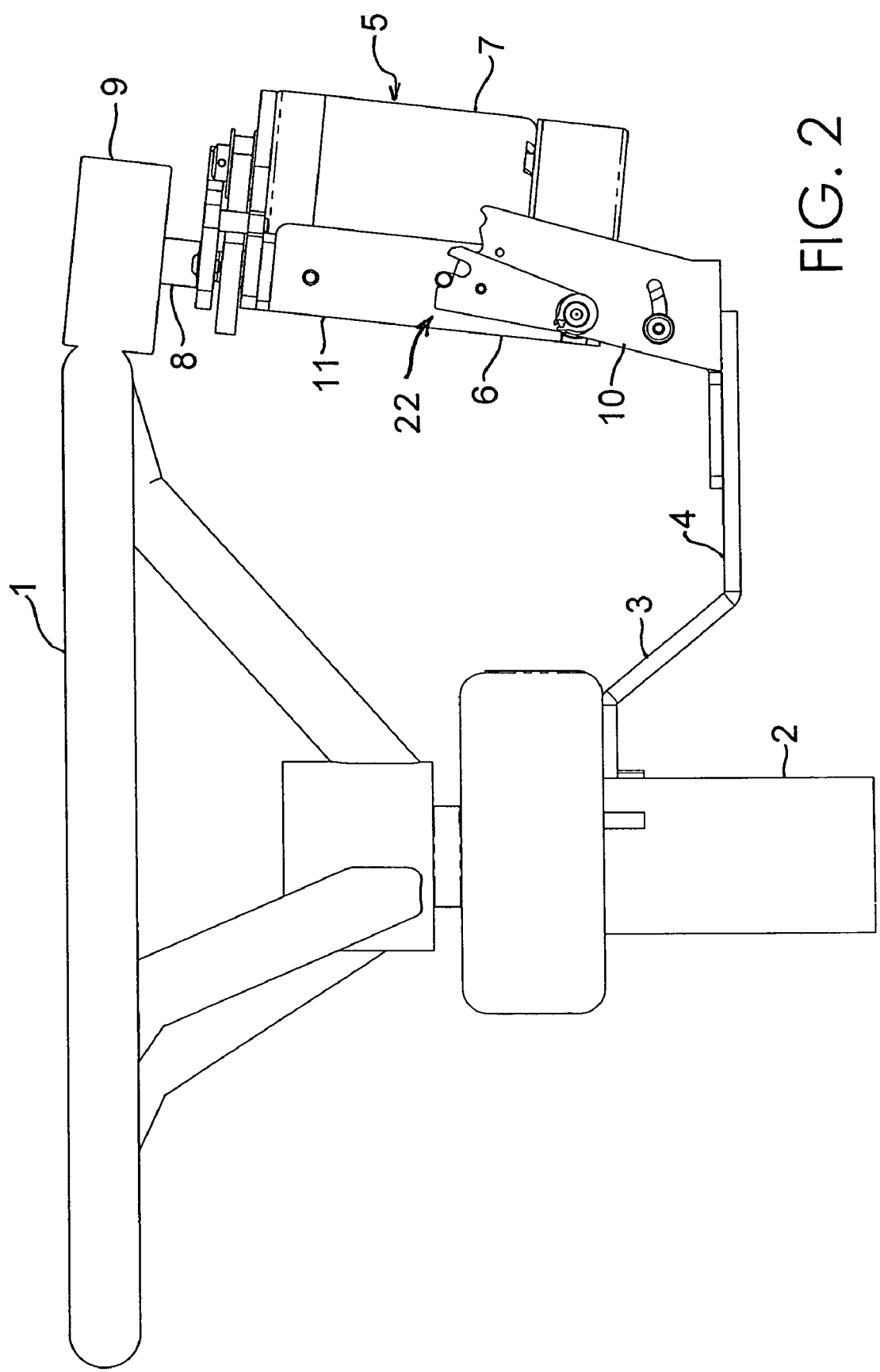
FIG. 2 is a view of the motor arrangement of FIG. 1 in a position as engaged with the steering wheel.

As becomes apparent from FIG. 2, the electric motor 7 can be swung into a position in which the friction wheel 9 is in contact with the steering wheel 1 by frictional engagement so that the steering wheel can be rotated by switching on the electric motor 7. Swinging the electric motor 7 into the drive position shown in FIG. 2 and moving the electric motor 7 away from the steering wheel 1 and locking it in the disengaged position shown in FIG. 1 are enabled in easy manner by the motor mount 6 which is described in more detail in the following.

Figure 3:
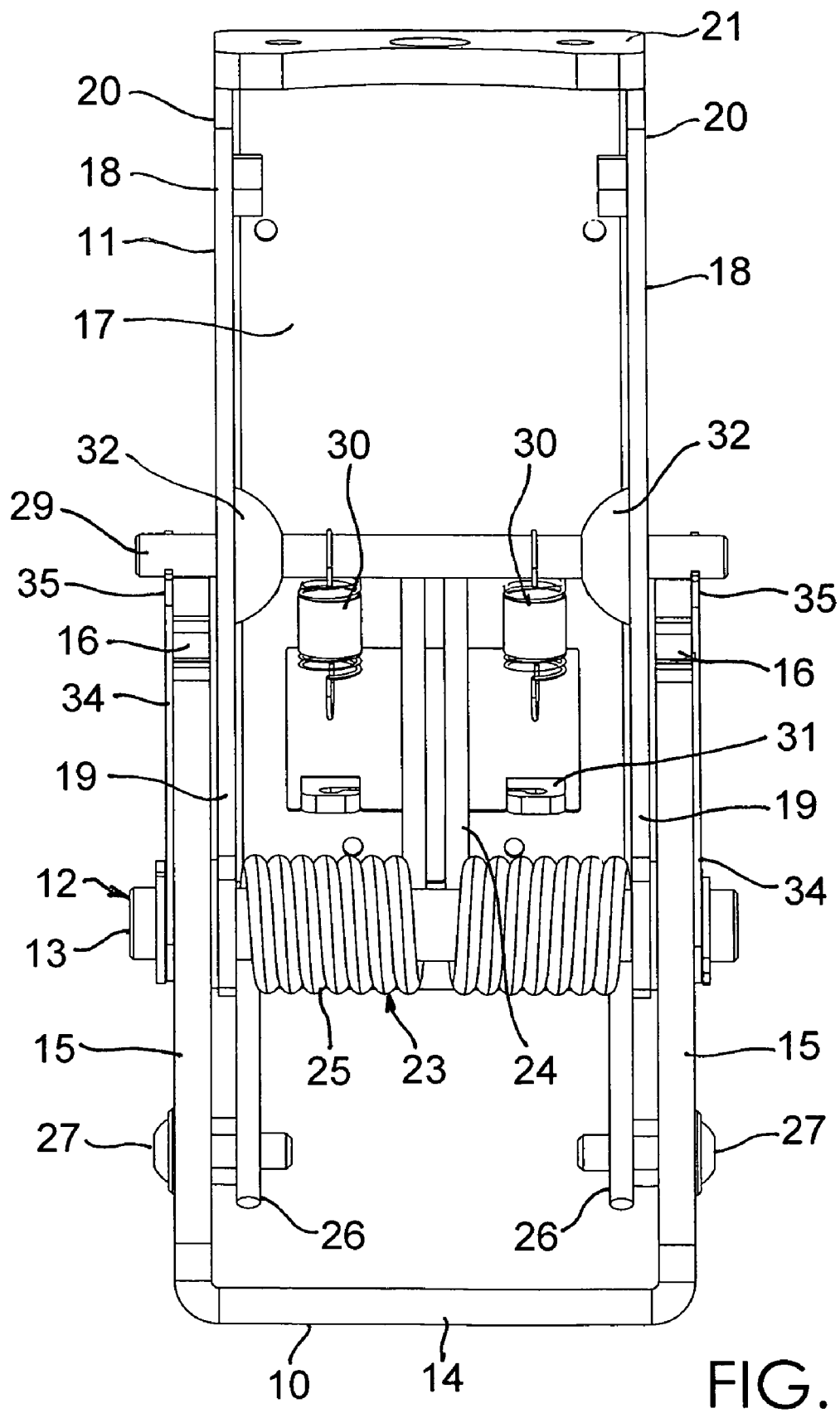
FIG. 3 is a view of the rear side of a motor mount, facing away from the steering wheel, of the motor arrangement of FIG. 1.

As FIG. 3 shows, the motor mount 6 includes a main support 10 and a motor support 11 which are rotatably connected to one another by a pivot bearing 12 with an axle 13. The main support 10 is U-shaped, forming a central fastening section 14 and two arms 15 which embrace the motor support 11. Provided at the free ends of the arms 15 are control cams 16 which resemble each other. The motor support 11 is comprised of a rectangular plate 17 which has legs 18 which on both longitudinal sides of said plate are bent at right angles to the same side of the plate and are aligned parallel to the arms 15. The one ends 19 of the legs 18 have bores through which the axle 13 extends. Fastened, for example by welding, to the other leg ends 20 and to the end of the plate 17 is a back plate 21. The back plate 21 is aligned at right angles to the plate 17 and is used to mount the electric motor 7.

Seated on the section of the axle 13 between the legs 18 is a torsion spring 23 which has a central spring leg 24, two symmetrical coil sections 25 and two outer spring legs 26. The central spring leg 24 rests with its free ends on the plate 17. The outer spring legs 26 take support on adjustable stop screws 27 which are fixedly held in slots in the arms 15.

In the region of the control cams 16 each of the legs 18 has in its center a respective slot 28 extending in the longitudinal direction. Arranged in the slot 28 is a rod-shaped locking element 29. The locking element 29 projects with its two ends out of the legs 18 and rests against the control cams 16. Between the legs 18, tension springs 30 have one of their ends suspended on the locking element 29. The other ends of the tension springs 30 are connected to holding lugs 31 which are fastened to the plate 17. The tension springs 30 operate to pull the locking element 29 against the control cams 16. For fixedly securing the locking element 29 in axial direction, guide rings 32 are fastened to it which are in sliding engagement with the mutually facing inner sides of the legs 18.

Arranged on the outer sides of the arms 15 are control elements 34. Each control element 34 has one end rotatably mounted on the axle 13, while its other end is provided with a control recess 35 into which the end of the locking element 29 projecting beyond the neighboring control cam 16 engages. Bearing disks and retaining rings which are secured to the free ends of the axle 13 hold the control elements 34 in frictional-engagement contact with the outer surfaces of the arms 15.

The mode of operation of the motor mount 6 will be explained below in more detail with reference to FIGS. 4 to 9.

FIG. 4 shows the control cams 16 at the end of the arms 15. Each control cam 16 comprises a leading stop surface 37 and a trailing stop surface 38, a leading guiding surface 39 and a trailing guiding surface 40, and a detent notch 41 which is arranged between the guiding surfaces 39, 40 and has a ramp surface 42. The leading stop surface 37 limits, through contact with the locking element 29, the pivoting movement of the motor support 11 in the direction of the steering wheel 1. This limiting function is necessary only for safety reasons and to facilitate assembly. In the properly installed position, the friction wheel 9 makes contact with the steering wheel 1 before the locking element 29 reaches the stop surface 37. The trailing stop surface 38 limits the pivoting movement of the motor support 11 in the opposite direction and, like the stop surface 37, prevents the locking element from leaving the control cams 16.

The guiding surfaces 39, 40 lie on the arc of a circle having radius R about the axle 13. They make sure that when the motor support 11 pivots in the one or other direction the locking element 29 is able to vary its position in the control recesses 35 of the control elements 34 in the manner required. The detent notch 41 serves to retain the motor support 11 in the disengaged position shown in FIG. 1. The ramp surface 42 operates to forcibly urge the locking element 29 out of the detent notch 41 when the motor support 11 is moved away from the steering wheel 1.

Figure 7:
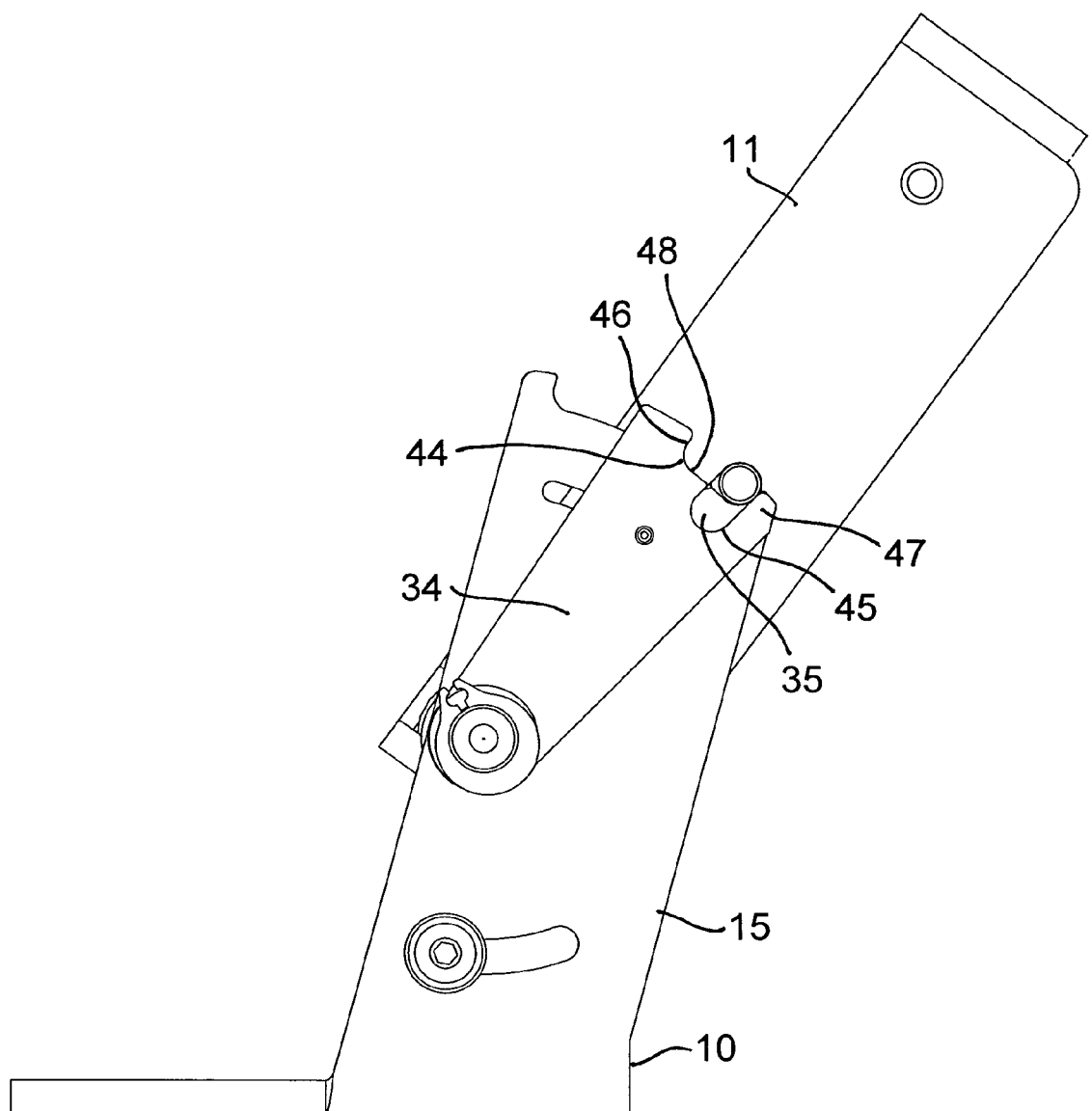
FIG. 7 is a side view of the motor mount of FIG. 3 held in a released position.

The design of the control recess 35 of the control elements 34 is best seen in FIG. 7. It is comprised of a front section 44 and a rear section 45. The two sections 44, 45 merge with each other and are bounded on their opposite sides by stops 46, 47. The front section 44 has a supporting surface 48 whose distance from the center of the axle 13 is equal to or slightly smaller than the radius R. The rear section 45 forms a depression which extends in the direction of the axle 13 and whose depth is equal to or larger than the depth of the detent notch 41.

In FIG. 5 the motor support 11 is shown in the front stop position in which the locking element 29 rests against the stop surface 37 and engages into the section 44 of the control recess 35. In the position of FIG. 2 the situation is similar. There the motor support 11 and the control element 34 are not swung quite so far to the left however so that the locking element 29 is in spaced relationship to the stop surface 37.

Figure 6:
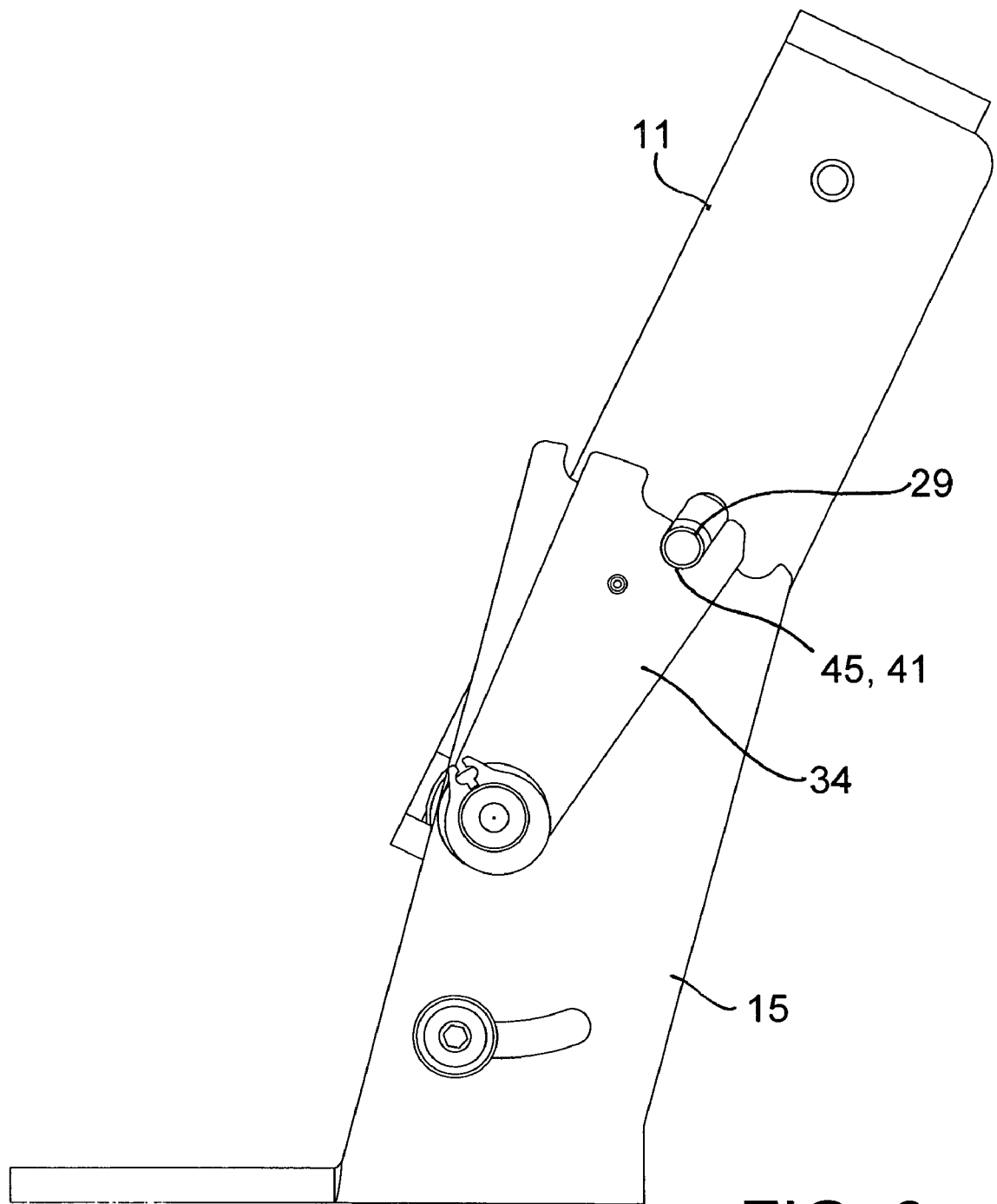
FIG. 6 is a side view of the motor mount of FIG. 3 held in a locked position.

When it is desired to disengage the friction wheel 9 and the electric motor 7 from the steering wheel 1, it suffices to swing the electric motor 7 together with the motor support 11 away from the steering wheel 1. As this occurs, the locking element 29 slides on the guiding surfaces 39 of the arms 15 in the direction of the detent notch 41. Initially the control element 34 takes no part in this movement because the supporting surface 48 of the control recess 35 is spaced from the axle 13 by a slightly smaller distance than the guiding surface 39. The control elements 34 are therefore retained initially by the frictional contact on the arms 15. It is not until the locking element 29 comes into contact with the rear stops 47 of the control elements 34 that the control elements 34 are also entrained by the locking element 29 on the way to the detent notches 41. When the locking element 29 reaches the detent notches 41, it snaps into them under the action of the tension springs 30, entering also the rear sections 45 of the control elements 34. In this position, which is shown in FIGS. 1 and 6, the electric motor 7 can be let go because the locking element 29 prevents the motor support 11 from returning to the previous engaged position. The force of the torsion springs 23 acting on the motor support 11 is transferred from the locking element 29 onto the arms 15 and holds the motor support 11 securely in this position.

Figure 8:
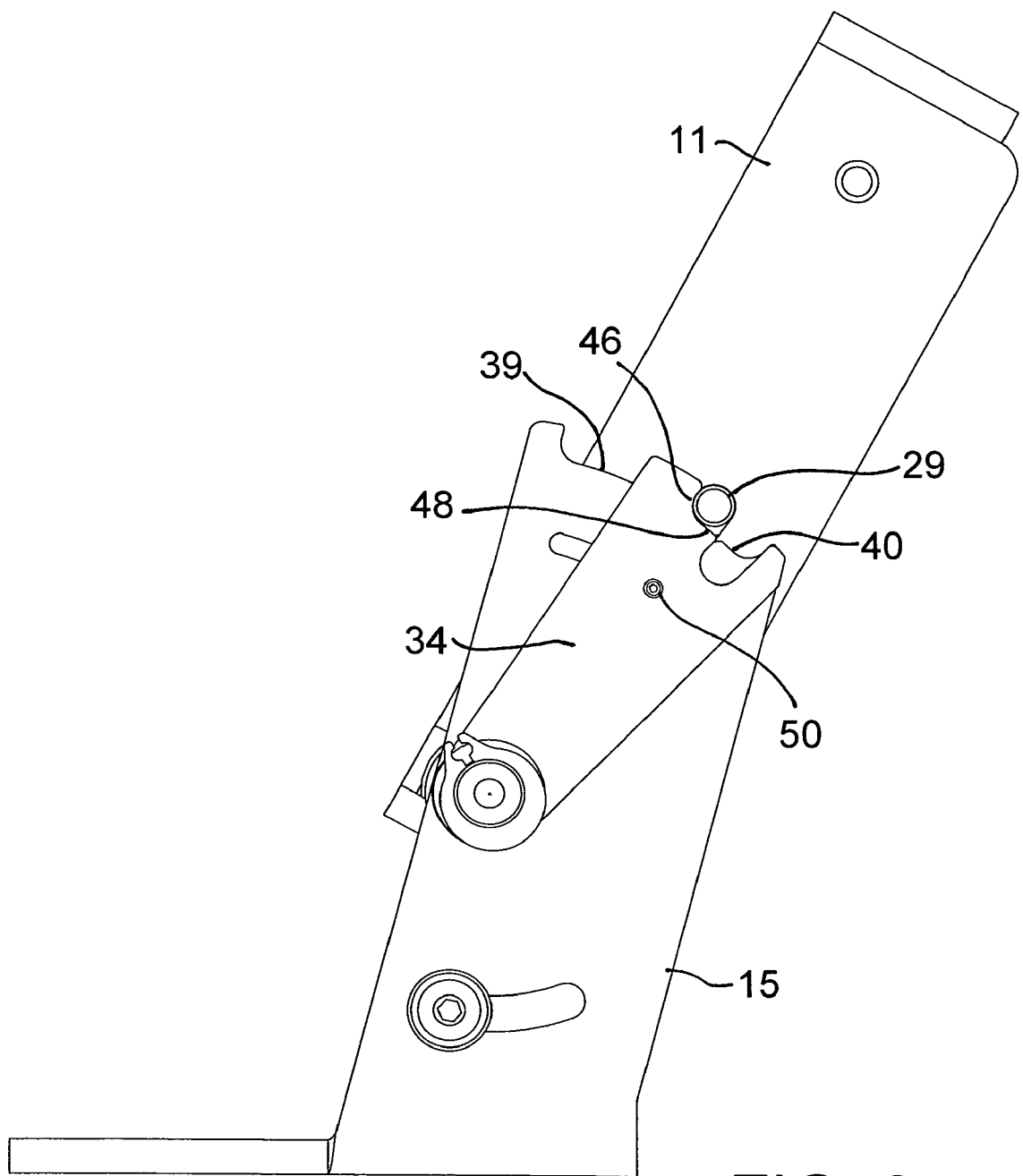
FIG. 8 is a side view of the motor mount of FIG. 3 in a first intermediate position during engagement.
Figure 9:
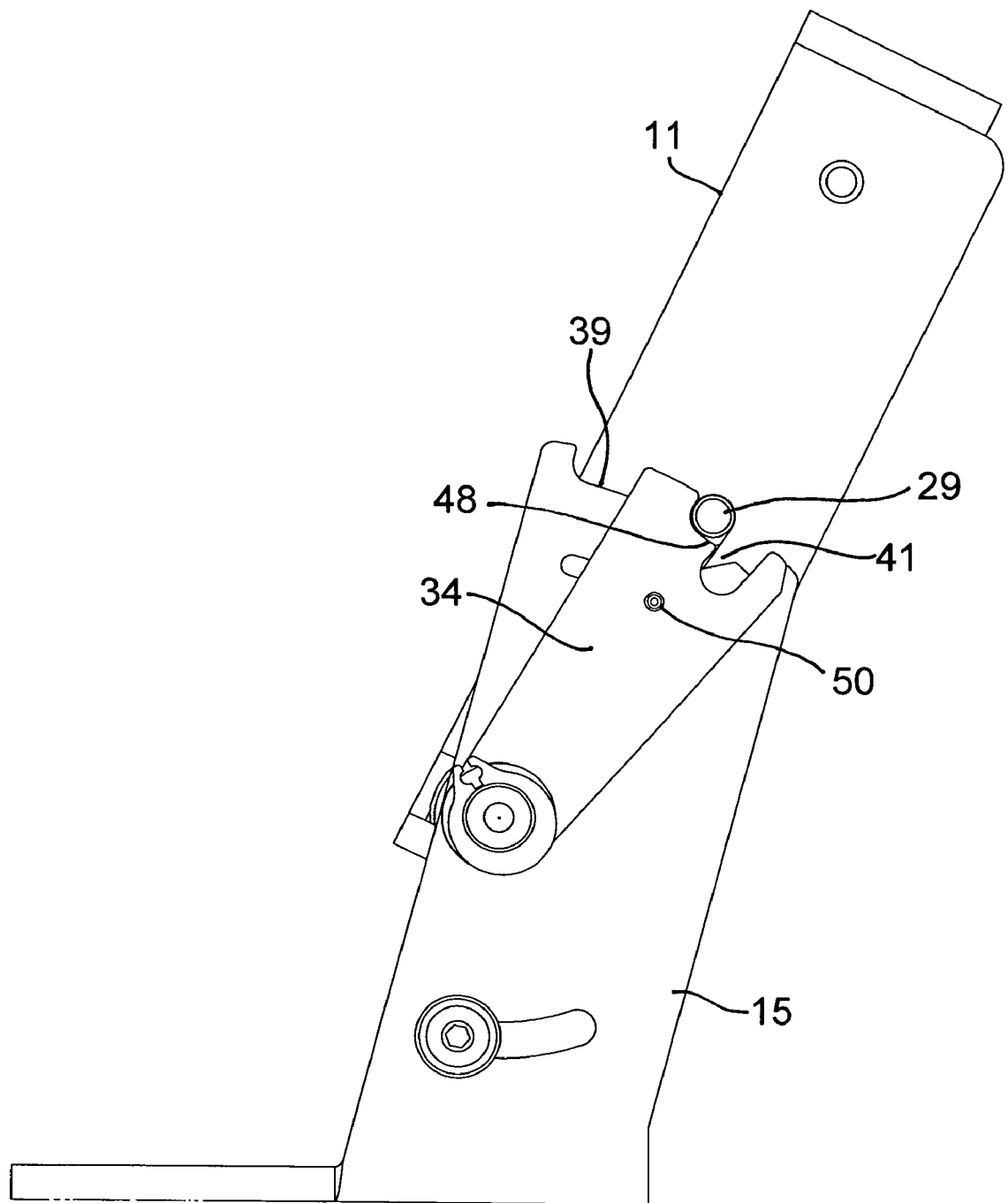
FIG. 9 is a side view of the motor mount of FIG. 3 in a second intermediate position during engagement.

If the electric motor 7 is to be engaged again against the steering wheel 1, it is first necessary for it to be swung together with the motor support 11 further in the direction of disengagement. In this process, the locking element 29 is urged forcibly over the ramp surfaces 42 radially outwardly relative to the axle 13 and made to engage with the guiding surfaces 40 and the stop surfaces 38. The control elements 34 are caused to follow this pivoting movement by the locking element 29, whereby the locking element 29 leaves the sections 45. The position now reached is shown in FIG. 7. This position is not stable because the torsion spring 23 bearing against the motor support 11 in the direction of the steering wheel 1 no longer takes support on the arms 15 but is held in equilibrium by the force exerted during pivoting by hand. If the manual force is now reduced or the motor let go completely, the torsion spring 23 pivots the motor support 11 together with the electric motor 7 in the direction of the steering wheel 1 until the friction wheel 9 engages the steering wheel 1. During this process the control elements 34 prevent the locking element 29 from snapping again into the detent notches 41. As is shown in FIG. 8, the locking element 29 is pushed, in the initial phase of the pivoting movement towards the steering wheel 1, by the guiding surfaces 40 onto the supporting surfaces 48 of the front section 44 of the control elements 34 because the control elements 34 are initially retained in the position shown in FIG. 7 by frictional engagement or with the aid of releasable detents. Not until the locking element 29 has reached the stops 46 are the control elements 34 also turned into the direction of engagement, as shown in FIG. 9. The supporting on the supporting surfaces 48 results in the locking element 29 being raised over and beyond the detent notches 41, thereby enabling it to slide onto the guiding surfaces 39. This enables the motor support 11 and the electric motor 7 to adopt unhindered the engaged position shown in FIG. 2, in which the friction wheel 9 is urged against the steering wheel 1 by the force of the torsion spring 23.

The force required for retaining the control elements 34 in the position shown in FIG. 7 when the locking element 29 slides onto the supporting surface 48 is obtained in simple manner by means of bores 49, visible in FIG. 5, which are provided in the arms 15 and by stud-type elevations on the inner sides of the control elements 34, which in the position shown in FIG. 7 snappingly engage the bores 49. The stud-type elevations are visible on the outer sides of the control elements 34 as indentations 50 and can be formed in simple manner by plastic deformation of the material of the control elements 34 using a spherical tip. Alternatively, a friction locking mechanism or detents similar to the locking device can be provided instead of the studs and bores.

What is claimed is:

1. A motor arrangement on the steering wheel of a vehicle, comprising a motor, a friction wheel drivable by the motor and engagable against the steering wheel, and a motor mount having a main support that is securely connectable to the vehicle and a motor support that is mounted on the main support for pivotal movement about an axle and is securely connectable to the motor, and a first spring bearing against the main support and the motor support and attempting to turn the motor support relative to the main support in a direction of engagement, and further comprising a locking device which limits the pivoting movement of the motor support relative to the main support, adopts a locked position upon reaching a first pivot angle as the result of a pivoting movement of the motor support in the direction of disengagement, and is unlockable by a pivoting movement in the direction of disengagement which exceeds the first pivot angle by a second pivot angle, wherein the locking device includes a locking element which is movably mounted on the motor support in a guide, can be urged by the force of a second spring against a control cam formed on the main support, and slides along the control cam when the motor support executes a pivoting movement.

2. The motor arrangement according to claim 1, wherein the control cam includes a leading guiding surface, a trailing guiding surface and, between said two guiding surfaces, a detent notch which is connected by a ramp surface to the trailing guiding surface.

3. The motor arrangement according to claim 2, wherein the locking device includes a control element on which the locking element is able to take support such that it is prevented from snapping into the detent notch when the motor support performs a pivoting movement out of the released position in the direction of engagement.

4. The motor arrangement according to claim 3, wherein the control element is arranged on the main support adjacent to the control cam and is movable in the longitudinal direction of the control cam, and that the control element has a control recess for locking engagement by the locking element.

5. The motor arrangement according to claim 4, wherein the control recess has a front section with a supporting surface for supporting the locking element on a movement in the direction of engagement, and a rear section into which the locking element engages in the locked position.

6. The motor arrangement according to claim 3, wherein the control element is retainable on the main support by means of detents.

7. The motor arrangement according to claim 3, wherein the control element is connected to the main support by a friction locking mechanism.

8. The motor arrangement according to claim 3, wherein the control element is rotatably mounted on the axle of the motor support.

9. The motor arrangement according to claim 1, wherein at the ends of the control cam stop surfaces are provided which limit the movement of the locking element.

10. The motor arrangement according to claim 1, wherein the first spring is a torsion spring which is seated on the axle of the motor support, said torsion spring bearing with the one spring leg against the motor support and with the other spring leg against the main support.

11. The motor arrangement according to claim 10, wherein one spring leg of the torsion spring takes support on an adjustable stop screw.

\* \* \* \* \*